United States Patent [19]
Bouraoui et al.

[11] Patent Number: 6,007,466
[45] Date of Patent: Dec. 28, 1999

[54] CUT-OUT INTEGRATED CLOSURE AND FORMING METHOD THEREFOR

[75] Inventors: Hichem Bouraoui, Arlington Heights; Jens Mogard, Buffalo Grove, both of Ill.; Antonio Rendina, Carpi, Italy

[73] Assignee: Tetra Laval Holdings & Finance, SA, Pully, Switzerland

[21] Appl. No.: 09/140,300

[22] Filed: Aug. 25, 1998

Related U.S. Application Data

[62] Division of application No. 08/856,350, May 14, 1997, Pat. No. 5,829,672.

[51] Int. Cl.[6] .................................................. B31B 1/84
[52] U.S. Cl. ............................ 493/87; 493/102; 53/133.2
[58] Field of Search ............................. 493/87, 374, 379, 493/102; 53/133.2

[56] References Cited

U.S. PATENT DOCUMENTS

| | | | |
|---|---|---|---|
| 3,605,578 | 9/1971 | Sternau | 493/87 |
| 4,464,154 | 8/1984 | Ljungcrantz | 493/87 |
| 4,925,034 | 5/1990 | Robichaud et al. | 493/87 |
| 5,098,365 | 3/1992 | Lija | 493/87 |
| 5,495,706 | 3/1996 | Bjorck et al. | 53/133.2 |
| 5,875,958 | 3/1999 | Weiteder et al. | 493/87 |

*Primary Examiner*—Eugene L. Kim
*Attorney, Agent, or Firm*—Welsh & Katz, Ltd.

[57] ABSTRACT

A container and closure package includes container material stock formed of a severable material defining an opening therein defining a removable confetti portion and a dispensing member molded to the material stock. The dispensing member is superimposed over the opening to substantially overlie the confetti portion. The confetti portion can be ejected from the material stock when the dispensing member is molded to the container stock and can be integrated into the closure package to form a portion thereof. The dispensing member can be a spout and can include a cover or cap integral therewith. The cap is formed with the confetti portion forming a portion of the top wall thereof. Alternately, the closure package includes a spout, such as a threaded spout which is formed extending from the container stock. The confetti portion is formed integral with the spout to establish a seal therefor. The seal can be gas-impermeable.

5 Claims, 3 Drawing Sheets

CUT-OUT INTEGRATED CLOSURE AND FORMING METHOD THEREFOR

CROSS REFERENCES TO RELATED APPLICATIONS

This application is a divisional application of co-pending U.S. Pat. application Ser. No. 08/856,350, now U.S. Pat. No. 5,829,672 filed on May 14, 1997.

BACKGROUND OF THE INVENTION

1. Field of the Invention

This invention relates to closures and closure membranes. More particularly, the invention relates to closures and closure membranes that incorporate a portion of the container cut-out therein, and methods of forming such closures.

2. Description of the Related Art

Containers having spouts incorporated into the packaging have come into widespread use. Such containers are used for, for example, storing liquid, powdered and granulated goods. These types of containers are commonly used in the food packaging industry.

One type of commonly used package includes a closure having an upstanding, molded spout. These containers will be recognized as those used for packaging juice and the like. Typically, the spout has a threaded body that is injection molded, that is then mounted onto the container and permanently affixed thereto. The container can be of the gable top type, formed of laminated fiber of paper-board like material. Such laminates can include, for example, a metallic foil such as a barrier material, formed as part of the laminate. Other materials that can be used to form such containers include plastics, such as polyethylene and the like.

Various methods are used for forming container spouts. In a commonly recognized method, a cut-out is formed in the container stock. The cut-out defines the opening in the container through which the container contents are poured or dispensed. The cut-out is discarded or otherwise treated as waste from the manufacturing process, and the spout is mounted to the container stock over the opening. The cut-out may be recycled and reused in the container manufacturing process, however, as will be recognized by those skilled in the art, the recycling process can be cost or process prohibitive.

In many food packages, the spouts and the closures attendant thereto are color codes. Color coding may be representative of the contents of the container. Inasmuch as color coding provides numerous advantages over non-colored spouts and closures, such as consumer product recognition and packaging aesthetic appeal, such color coding can significantly increase the cost to manufacture the container components.

Typically, color additives or agents are added to the plastics prior to the spout and closure molding process. Thus, the plastic that is introduced to the injection molding apparatus has coloring agents mixed therewith. If it is desired to change the color of the spout or closure, the apparatus must be taken out of service or otherwise cleaned of any colored plastic residue that remains from the molding process.

Moreover, the color of a spout may be required to match the color of the container or the color of the closure. Such color-for-color matching can be troublesome if the color shades are not within some predetermined tolerance.

It has also become accepted practice, for some products, to incorporate a membrane or like seal across the spout opening. The seal can be used to provide visible discernible indication or evidence of tampering. Such seals can also provide a gas-impermeable seal, if formed of, for example, foil. Typically, the seal extends across the spout opening.

It will be readily apparent that a major cost in the manufacture of such containers is in connection with the container materials. Thus, savings in material costs, while maintaining packaging integrity, can provide a significant advantage over known package configurations and manufacturing methods.

Accordingly, there continues to be a need for a closure package and method of forming such a package in which a portion of the container that is removed or cut out during manufacture is used in forming the closure package. Such a closure package reduces the amount of waste from the manufacturing process and reduces the overall material costs by effectively using all or most of the available material in the closure package construction. A method in which such a package is formed uses commonly accepted manufacturing principles and readily available packaging materials. Such a method integrates the otherwise discarded container material into the closure package.

BRIEF SUMMARY OF THE INVENTION

A container and closure package includes container material stock formed of a severable material having an opening formed therein defining a removable confetti portion and a dispensing member molded to the material stock to define a dispensing opening therein. The dispensing member is superimposed over the opening to substantially overlie the confetti portion. The confetti portion can be removed or ejected from the material stock when the dispensing member is molded to the container stock and can be integrated into the closure package to form a portion thereof.

In a preferred arrangement, the dispensing member is a spout and includes a cover or cap integral therewith. The cap includes a depending skirt that is configured to coact with the spout to form a seal therebetween. The confetti portion is ejected from the container material stock and is molded to the cap to form a portion of the top wall thereof.

In an alternate embodiment, the closure package includes a spout, such as a threaded spout which is formed extending from the container stock. The confetti portion that is ejected from the container material stock forms a membrane, and preferably a sealing membrane, extending cross the opening of the spout. The seal can be configured to be gas-impermeable, such as when the container material stock is formed of a gas-impermeable material. The closure package can include a threaded cap which is adapted to engage the thread formation on the spout.

A method of forming the cut-out integrated injection molded closure package includes defining an opening outline in the material stock, such that the opening outline defines the removable confetti portion. A dispensing member is molded to the material stock to overlie the opening outline. The dispensing member defines a dispensing opening therein. The confetti portion is separated from the material stock as the dispensing member is formed and is integrated into the closure package.

The closure package can be formed including a cover or cap integral therewith, and the confetti portion can be molded integral with the cap as a top wall portion. Alternately, the confetti portion can be molded into the dispensing member to form a membrane across the dispensing member opening. Preferably, the membrane is formed as a sealing membrane.

Other features and advantages of the present invention will be apparent from the following detailed description, the accompanying drawings, and the appended claims.

DETAILED DESCRIPTION OF THE INVENTION

Figure 1:
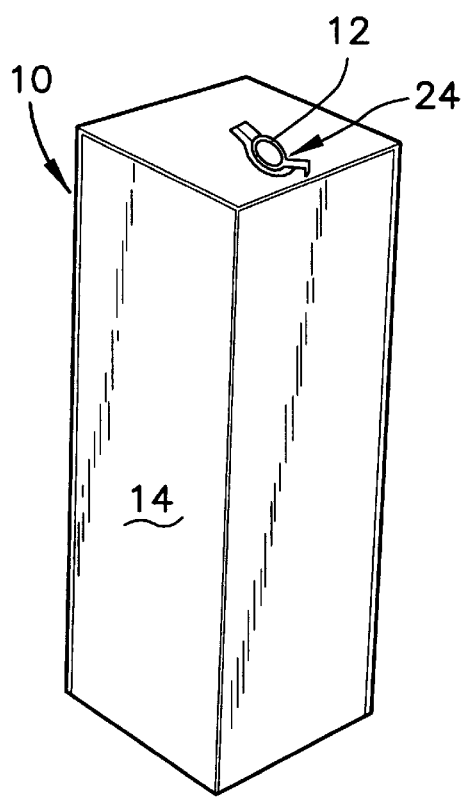
FIG. 1 is a perspective view of a container having an embodiment of a cut-out integrated injection molded closure package in accordance with the principles of the present invention, the closure being illustrated in the closed position.
Figure 2:
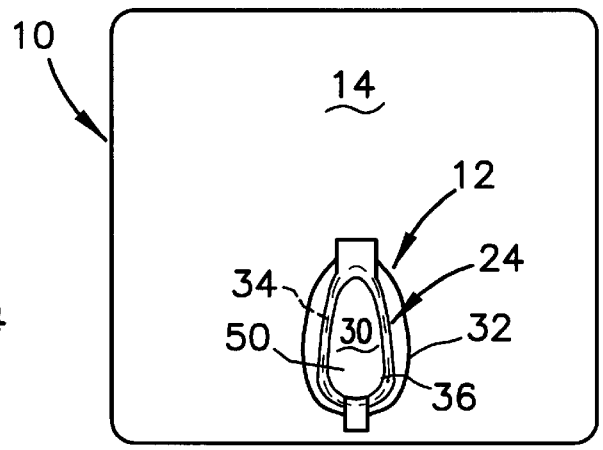
FIG. 2 is a top view of the container and closure package of FIG. 1.
Figure 3:
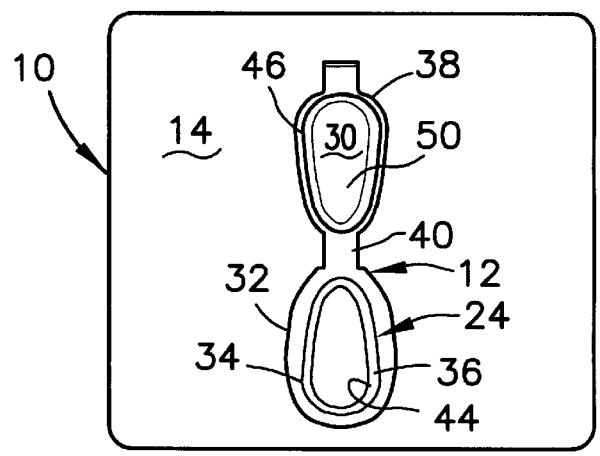
FIG. 3 is a top view of the container and closure package of FIG. 2, illustrated with the closure in the open position.

Referring now to the figures and in particular to FIGS. 1–3, there is shown a container 10 having an embodiment 12 of a closure package molded thereto, in accordance with the principles of the present invention. The container 10 can be used to store, for example, liquid, powdered and granulated products. In a common application, the container 10 is used to store liquid food products such as juice, milk and the like.

The container 10 is formed of a severable, i.e., cuttable, material stock 14. In one embodiment, illustrated in FIG. 7b, the material stock 14 is a laminate L having a paper-board substrate 16 and an inner layer 18 of a thermoplastic material, such as low density polyethylene (LDPE). The inner layer 18 is that layer which comes into contact with the material stored in the container 10. The container 10 may include a barrier material 20 disposed between the substrate 16 and the inner layer 18, such as a metal (e.g., aluminum) foil to provide enhanced gas-impermeability characteristics to the container 10. An outer layer 22 of LDPE can be formed on the substrate 16 to provide additional integrity to the container 10 and to increase the liquid impermeability thereof.

Laminated container structures are disclosed in Andersson et al., U.S. Pat. No. 4,989,736, which patent is incorporated herein by reference. It will be recognized by those skilled in the art that such containers 10 can be formed of other materials, including containers formed wholly of thermoplastic materials, which containers and materials of construction are within the scope of the present invention.

Figure 7A:
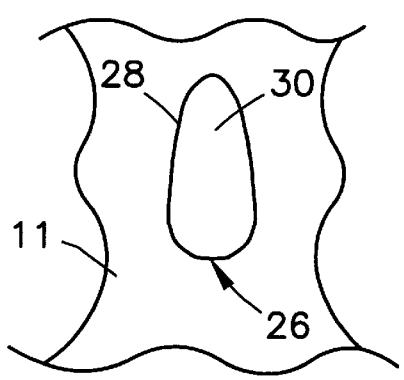
FIG. 7a is an illustration of the opening outline formed in the container material stock and the confetti portion defined thereby.
Figure 7B:
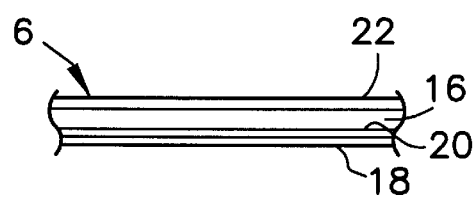
FIG. 7b is a cross-sectional view of an exemplary laminate structure used to form the container stock material.

The container 10 includes a dispensing member 24 that is molded onto the container 10, such as the exemplary pour spout. The spout 24 is formed on a portion of the material stock 14, over an area having an opening outline 26 defined thereon, as shown in FIG. 7a. The opening outline 26 can be formed by partially impressing or cutting into the material stock 14 to form a weakened region in the stock 14. The outline 26 can be a continuous line 28 of weakening, as illustrated, that penetrates one or more of the layers 16, 18, 20, 22 of the laminate L stock 14, or it can be a series of partial perforations into the stock 14. The portion of the stock 14 within the bounds of the outline 26 defines a removable cut-out or confetti portion 30.

In a traditional container manufacturing process, the confetti portion 30 is discarded or otherwise recycled for reuse in the process. Typically, however, because of the difficulties of recycling laminated materials, the confetti portion 30 is treated as a waste product and is discarded. This waste, while small relative to each individual container 10, in the aggregate can be quite substantial. It is thus advantageous to integrate the confetti portion 30 into the container 10 of closure package 12 to, if possible, reduce the amount of waste, and to maximize material use. It is most advantageous if the otherwise discarded material can be used as a replacement or substitute for a material that is otherwise required for the container 10 or closure 12.

Figure 4:
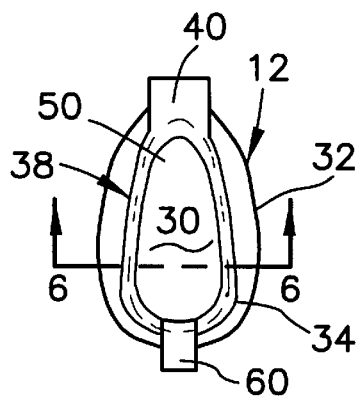
FIG. 4 is a top view of the closure of FIG. 2, with the closure illustrated in the closed position.
Figure 5:
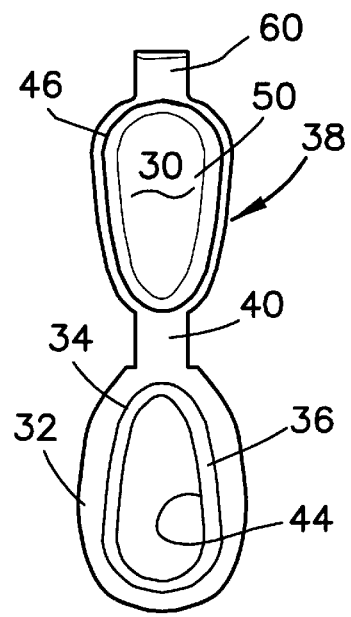
FIG. 5 is a top view of the closure of FIG. 4, illustrated in the open position.
Figure 6:
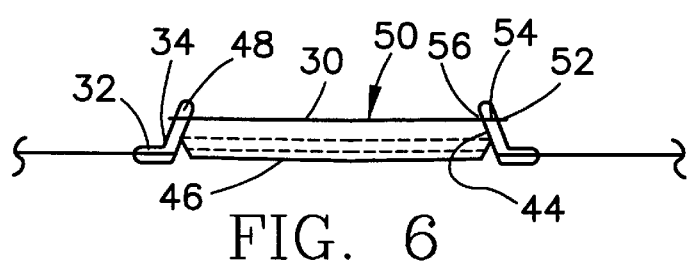
FIG. 6 is a cross-sectional view of the closure taken along line 6—6 of FIG. 4.

The present closure package 12 uses the confetti portion 30 and integrates the confetti 30 into the closure package 12. As illustrated in FIGS. 4–6, in one embodiment, the closure package 12 includes a dispensing member 24 which is formed as an upstanding pour spout that is mounted to the container 10 stock 14 at about a flange 32. The spout 24 is injection molded directly onto the container 10 material stock 14, superimposed over the opening outline 26.

The flange 32 is formed as an integral portion of the dispensing member 24 and provides a connection between the upstanding spout portion 36 and the container stock 14 to secure or mount the spout 24 to the container 10. The confetti portion 30 is forced or ejected from the material stock 14 as a result of the injection mold engaging the stock 14, and the pressure internal to the mold from the flowing plastic. A base portion 34 of the spout extends from the flange 32 to the upstanding portion 36 of the spout 24.

The closure package 12 includes a cap 38 that is connected to the base portion 34 by a hinge element 40. In one embodiment, the hinge element 40 is a flexible strip-like element that extends between the cap 38 and the base portion 34 and permits the closure 12 to be repeatedly opened and closed with minimal possibility of tearing or breaking of the hinge 40. As illustrated in FIG. 6, the spout 24 includes an engaging lip 44 that extends generally upwardly from the base portion 34.

The cap 38 includes a complementary depending skirt portion 46 having a sealing bead 48 that extends outwardly from the skirt portion 46 that is configured to coact with the upstanding spout 36 inner wall. A top wall portion 50 extends within an upper area 52 of the depending skirt 46. When engaged with one another, the cap 38 and upstanding spout 36 form a substantially liquid-tight seal therebetween.

The confetti portion 30, which is ejected from the container material stock 14 during manufacture, is integrated into the cap 38. As best seen in FIGS. 4–6, the confetti portion 30 forms a part of the top wall portion 50 of the cap 38. A peripheral edge portion 54 of the plastic material is molded over the edge 56 of the confetti 30 to retain the confetti 30 in place and to form a seal between the confetti portion 30 and the molded plastic of the cap 38. The peripheral edge portion 54 is integral with the cap 38 depending skirt 46.

Advantageously, the confetti portion 30, when formed from container material stock 14 having a foil or like impermeable layer 20, enhances the gas-impermeability characteristics of the cap 38. In addition, because the confetti portion 30 is cut from the material stock 14, problems encountered with color matching of the cap 38 and the container 10 are obviated. If desired, the dispensing member 24 can be formed of a clear, white or opaque thermoplastic material, such that it will not detract from the aesthetic appeal of the container 10 and closure package 12. It will of course be understood that other colored materials can be used to form the plastic components of the closure package 12.

The cap 38 can include a grasping element 60, such as the exemplary grip tab 60, to facilitate opening the closure package 12 to dispense the container 10 contents. Those skilled in the art will readily recognize that such injection molded plastics can be formed with raised or embedded designs, such as logos and the like, in the molded plastic material.

Figure 8:
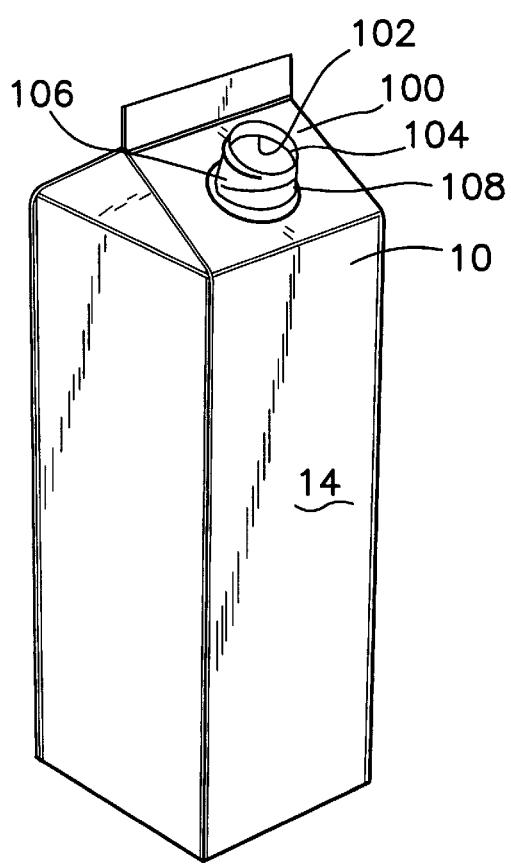
FIG. 8 is a perspective view of a container having an alternate embodiment of the injection molded closure molded thereto, the closure being illustrated with the closure cap engaged therewith.

In an alternate embodiment 100 of the closure package, as illustrated in FIGS. 8–9 a–c, the confetti portion 102 can be formed as a membrane extending across an opening 104 of a spout 106. The spout 106 can be formed having external threads 108 formed thereon. The threads 108 are adapted to engage the complementary threads 112 of a closure cap 110, as illustrated in FIGS. 9 a–c. The spout 106 is mounted to the container 10 at about a flange 114.

Figure 9A:
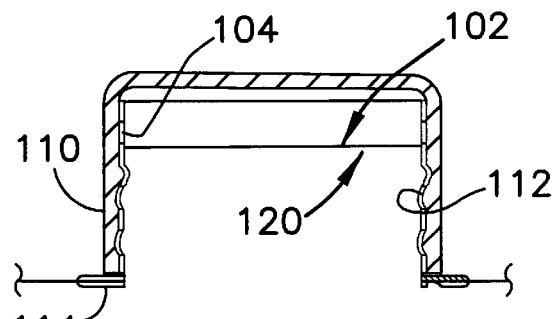
FIGS. 9 a–c are cross-sectional views illustrating various locations within the closure spout for incorporating the confetti or membrane seal in the closure of FIG. 8, the closure being illustrated with a closure cap in place thereon.
Figure 9B:
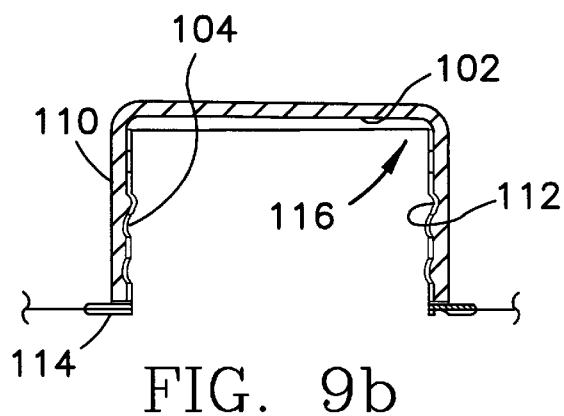
Figure 9C:
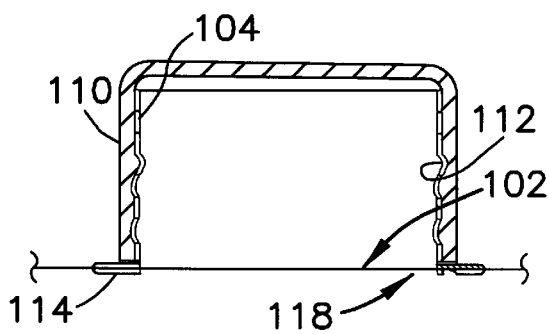

The confetti portion 102 is configured to extend across the spout 106 opening 104 to establish a seal. The confetti seal 102 can provide a gas-impermeable barrier to enhance the ability of the package 100 to reduce oxidation of the container 10 contents, and to maintain the contents fresh. As shown in FIGS. 9 a–c, the confetti portion 102 can be positioned at a variety of locations within the spout 106, such as at about an uppermost portion 116 thereof as shown in FIG. 9b, at about a lowermost portion 118 of the spout 106 as shown in FIG. 9c, and at an intermediate position as illustrated at 120 in FIG. 9a.

The closure 100 when used in conjunction with the cap 110 can provide not only a freshness seal 102 for the container 10 contents, but the seal 102 can also be used as a "tear seal" to provide visibly discernible tamper indication for the container 10. That is, the spout 106 can be configured such that the container 10 contents can only be accessed after the tear seal 102 is removed, e.g., torn, from the spout 106. In this arrangement, tampering of the container 10 can be discerned from viewing the integrity or condition of the seal 102 to spout 106 connection.

A method of forming the closure package 12, 100 includes defining an opening outline 26 in the material stock 14 and molding a dispensing member 24, 106, such as the exemplary spout to the material stock 14 so as to overlie the opening outline 26. The outline 26 can be defined by forming an impression in the stock 14 or by forming a continuous or a series discrete semi-through-wall perforations in the stock 14. The confetti portion 30, 102 is separated or ejected from the material stock 14 during the molding process and is integrated into the closure package 12, 100.

In one method, the confetti portion 30 is ejected from the container stock 14 and is integrated into a closure cap 38 as a part of the top wall portion 50 of the cap 38. The closure 12 is formed with a spout integral 24 with and molded onto the container stock 14. The spout 24 is connected to the stock 14 at about a flange 32. The cap 38 is connected to the spout 24 by forming a hinge, such as the flexible, strip-like hinge 40 that extends between the spout 24 and the cap 38.

The confetti portion 30 that is ejected from the container stock 14 is integrated into the cap 38 by molding the confetti portion 30 into the cap 38, central of a peripheral edge 54 of the cap 38. The cap 38 includes a depending skirt 46 extending downwardly from the peripheral edge 54. The depending skirt 46 has a locking lip or sealing bead 48 extending inwardly therefrom. The sealing bead 48 is configured to coact with the inner wall of the upstanding spout 36 to establish a leak-tight seal therebetween. When the container stock 14 is formed of a material having high gas-impermeability characteristics, the cap 38 takes on those same characteristics and provides a relatively gas-impermeable seal for the container 10.

In an alternate method of making the closure package, the confetti portion 102 is integrated into the spout 106 to form seal across the mouth 104 or opening of the spout 106. The seal 102 can be configured to be gas-impermeable and can be formed in any of a variety of positions within the spout 106. The closure 100 can be formed with a cap 110 attendant thereto, and the seal 102 can provide visibly discernible tamper indication of the container 10.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

We claim:

1. A method of forming a cut-out integrated injection molded closure package comprising the steps of:
    defining an opening outline in a material stock formed of a severable material, the opening outline defining a removable confetti portion;
    molding a dispensing member to the material stock so as to overlie the opening outline, the dispensing member defining a dispensing opening therein,
    ejecting the confetti portion from the material stock;
    integrating the confetti portion into the closure package; and
    forming a closure cap and integrating the confetti portion with the cap.

2. The method of forming a cut-out integrated injection molded closure package in accordance with claim 1 including the step of forming a hinge extending between the cap and the dispensing member.

3. A method of forming a cut-out integrated injection molded closure package comprising the steps of:
    defining an opening outline in a material stock formed of a severable material, the opening outline defining a removable confetti portion;
    molding a spout to the material stock so as to overlie the opening outline, the spout defining a dispensing opening therein,
    ejecting the confetti portion from the material stock; and
    integrating the confetti portion into an uppermost portion of the spout.

4. A method of forming a cut-out integrated injection molded closure package comprising the steps of:
    defining an opening outline in a material stock formed of a severable material, the opening outline defining a removable confetti portion;
    molding a spout to the material stock so as to overlie the opening outline, the spout defining a dispensing opening therein,
    ejecting the confetti portion from the material stock; and
    integrating the confetti portion into a lowermost portion of the spout.

5. The method of forming a cut-out integrated injection molded closure package in accordance with claim 1 including the step of forming the opening outline in the material stock.

* * * * *